March 15, 1960  H. HERRMANN  2,928,375
DRIVE FOR VIBRATOR DEVICE
Filed May 12, 1958  2 Sheets-Sheet 1
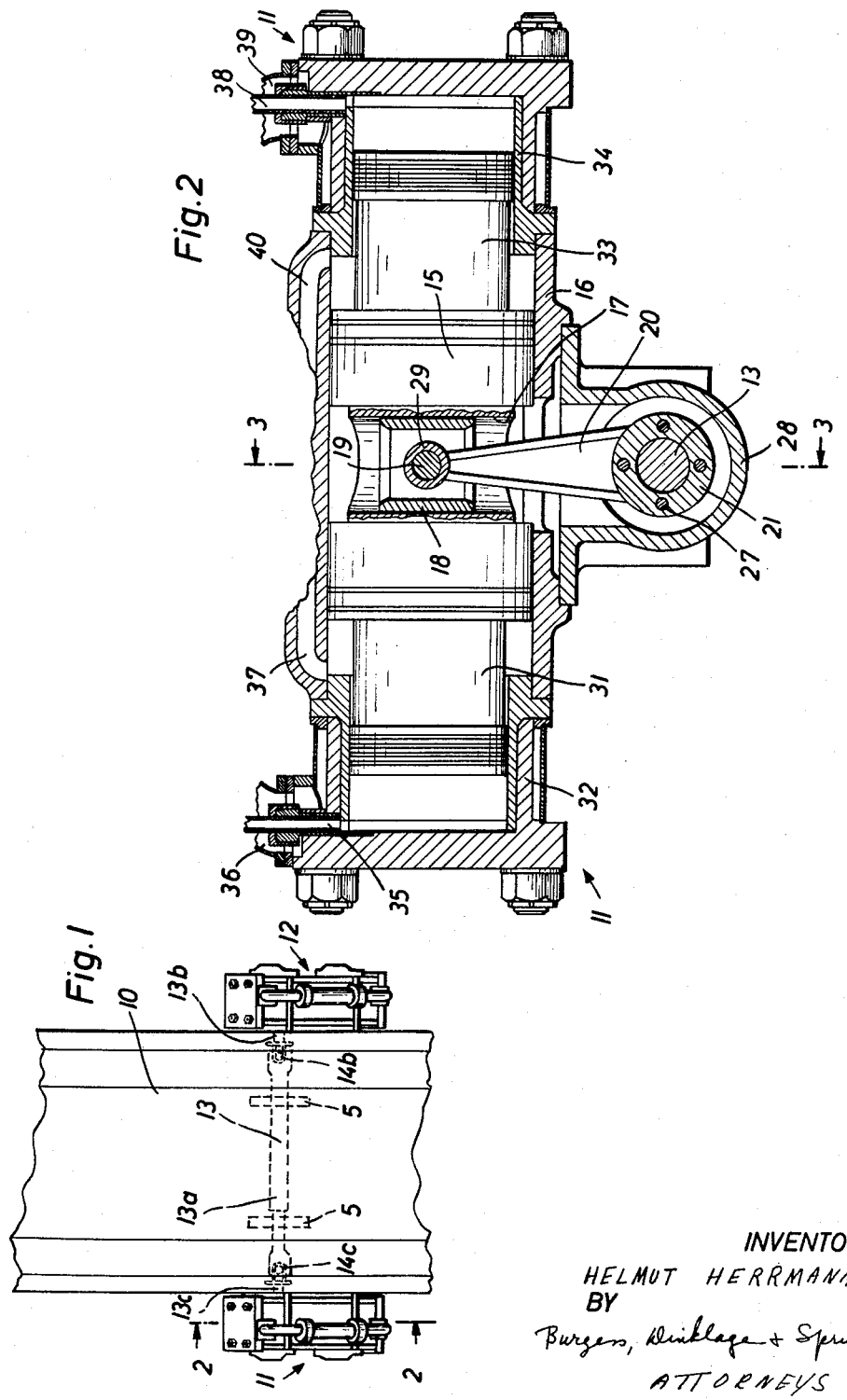
INVENTOR
HELMUT HERRMANN
BY
Burgess, Dinklage + Sprung
ATTORNEYS March 15, 1960  H. HERRMANN  2,928,375
DRIVE FOR VIBRATOR DEVICE
Filed May 12, 1958  2 Sheets-Sheet 2
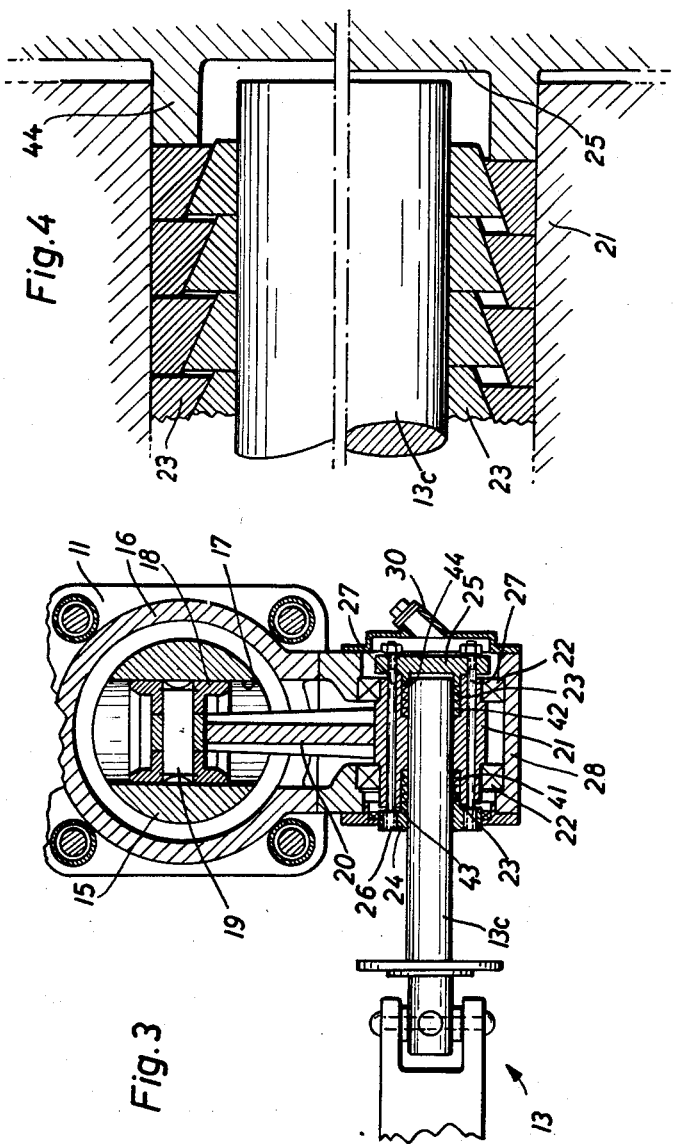
INVENTOR
HELMUT HERRMANN
BY
ATTORNEYS United States Patent Office 2,928,375
Patented Mar. 15, 1960

2,928,375

DRIVE FOR VIBRATOR DEVICE

Helmut Herrmann, Altlunen, Germany, assignor to Gewerkshaft Eisenhütte Westfalia, Wethmar, near Lunen (Westphalia), Germany Application May 12, 1958, Serial No. 734,556

Claims priority, application Germany May 17, 1957

7 Claims. (Cl. 121—1)

This invention relates to reciprocating drives for vibrating devices.

The invention was occasioned by the need for suitable reciprocating drives for vibrating conveyors, and accordingly, it will be described with reference to this service.

The art of conveyance is employing, to an increasing extent, vibrating conveyors. In this art, the conveyor is so placed in vibration that the material to be conveyed travels on the conveyance surface in the so-called microthrow method. The conveyor employed is usually an open trough. The passage for the material being conveyed should, insofar as possible, not be blocked by cross-members or supports for the vibration imparting motor or the like. It has already been proposed to provide one vibration motor on each side of the vibration trough. These motors must be arranged parallel with respect to each other. Their direction of vibration advantageously forms an acute angle with the longitudinal axis of the trough. In order to obtain a dependable conveyance, it is necessary for the vibrations of the two motors to take place synchronously. If electric vibration drives are provided, the synchronism is established directly by the frequency-dependent vibrations. In mining, however, it is preferable to employ pneumatic pistonvibrators in connection with which the synchronism cannot be directly obtained by control in a manner akin to that in which electric drives can be controlled.

A primary object of the present invention is to provide suitable means for synchronizing reciprocating motors employed to drive vibrating devices.

A further object of the invention is to provide suitable interconnection between reciprocating motors employed to drive vibrating devices, so that the performance of the drive is satisfactory notwithstanding relative shifting of the motors as commonly occurs when the drives are employed to drive rather heavy equipment such as conveyors and loading devices used in underground mining operations.

The foregoing objects can be attained by employment of the drive of the invention. This drive will be described with reference to the accompanying drawing. While the invention is described in this manner, it is pointed out that the device shown in the drawing is merely one embodiment of the drive.

In the drawings:

Fig. 1 is a schematic representation of a reciprocating drive according to the invention connected up to drive a mining conveyor or loading machine;

Fig. 2 is a cross-sectional view of a motor employed in the drive shown in Fig. 1, taken along line 2—2 of Fig. 1 which extends along the reciprocating axis of the motor;

Fig. 3 is a cross-section taken on line 3—3 of Fig. 2; and

Fig. 4 is an enlarged view of a portion of the device shown in Fig. 3 and illustrating conical clamping elements employed in the motor.

Referring to the drawings, there is there shown a loading device or pneumatic conveyor 10 provided with reciprocating drive suitable to impart a vibrating motion thereto. The reciprocating drive includes a shaft 13 disposed beneath the conveyor 10 and having operatively connected thereto at spaced intervals therealong reciprocating pneumatic motor 11 positioned on one side of the conveyor, and another reciprocating pneumatic motor 12 positioned on the other side of the conveyor. The motors are disposed at an acute angle to the longitudinal axis of the conveyor, i.e., there reciprocating axes are inclined. Take off members 5, for receiving motion from the shaft 13 and imparting motion to the conyeyor 10, are disposed beneath the conveyor and are operatively connected with the shaft 13 and the conveyor 10.

The reciprocating motor 11 comprises a piston-cylinder arrangement including a double acting piston 15 and cylinder 16. Thus the motor 11 includes a left hand piston 31 disposed in left hand cylinder 32 and a right hand piston 33 and disposed in right hand cylinder 34. Connected to the left hand cylinder 32, are service connections including intake line 35, exhaust line 36, and vent line 37. Likewise, there are connected to the right hand cylinder 34 service lines including inlet line 38, exhaust line 39, and vent 40. The reciprocating motor 12 is similarly constructed.

According to the invention, the motors 11 and 12 are arranged so that the reciprocating motion of the pistons is transverse to the axis of the shaft 13, and connecting means are provided which connect each of the piston-cylinder arrangements and the shaft, the connecting means being responsive to the reciprocating motion of the pistons and effective to impart a rocking or reciprocating rotary motion to the shaft.

In the embodiment shown in the drawing for the motor 11, the connecting means comprises a crank arm 20 having disposed at one end thereof a sleeve 21, which is operatively connected in a non-rotatable manner to the shaft 13, and has disposed at the other end thereof a piston pin sleeve 29, which is mounted for articulation on the piston pin 19. The piston pin 19 is connected to auxiliary piston 18, which is freely slidably mounted in auxiliary cylinder 17. The auxiliary cylinder 17, in turn, is fixedly secured to the double acting piston 15 at an axially intermediate point along the length thereof. In the operation of the motor, as the piston 15 reciprocates, cylinder 17 is moved axially of the motor so that the auxiliary piston 18 reciprocates in the auxiliary cylinder 17. This movement of the auxiliary piston-cylinder arrangement imparts a rocking motion to the crank arm 20, and since the sleeve 21 of the crank arm 20 is non-rotatably mounted on the shaft 13, this rocking motion is imparted to the shaft.

The motor 12 is connected to the shaft 13 in a similar manner by a crank arm. The crank arms are disposed in parallel relation and can be employed to support the shaft 13.

While in the embodiment shown in the drawing, the motion transferring means employs cylindrically developed parts in the form of the auxiliary piston cylinder arrangement, there can be used in place of these parts any sliding member and guide means defining a confined path for the sliding member, the guide means being secured to the piston 15 so that it moves therewith and so that the slide path which it provides is disposed transversely of the axis of the piston 15. The preferred construction for the sliding member, however, is a cylindrical construction.

A feature of the drive of the invention is that means are provided for advancing or retarding the action of one motor with respect to the action of the other motor in imparting a rocking motion to the shaft. Thus, the motors, which are adapted to operate at the same r.p.m., can be synchronized.

In the embodiment shown in the drawing, provision is made for advancing or retarding the action of one of the motors, e.g., the motor 11, by construction which permits releasing the engagement of the shaft 13 with the crank arm sleeve 21. This permits rotating the shaft with respect to the crank arm and thus permits making the desired adjustment. Referring to Fig. 3, the crank arm sleeve 21 is mounted within housing 28 which includes grease cup 30 and anti-friction bearings 22 mounted between the crank arm sleeve 21 and the housing 28, to facilitate smooth motion of the sleeve 21 within the housing. Each end of the sleeve 21 is formed with an enlarged bore, whereby there is formed at each end of the sleeve between the sleeve and the shaft 13, annular spaces 41 and 42. Disposed within these annular spaces, are conical clamping elements 23 (see Fig. 4). Provided for cooperation with the clamping elements, are the flange followers including outer follower 25, disposed at the outer end of the sleeve 21 and having a tongue 44 which projects into the annular space 42 and engages the conical clamping elements disposed in this space; and inner follower 24 disposed at the inner end of the sleeve 21 and which is similarly provided with a tongue 43 which similarly projects into annular space 41 and engages the clamping elements disposed therein. Bolts 27 extend axially through the sleeve 21 and engage the followers 24 and 25 respectively so that by threading of these bolts on the followers, the conical clamping elements can be caused to either tightly engage the sleeve 21 and the shaft so that the sleeve becomes non-rotatably mounted on the shaft, or to effect a release of engagement between the sleeve 21 and the shaft. Thus the invention provides means for selectively applying compression to the clamping elements so as to permit release of engagement of the interconnecting means and the shaft and hence permit advancing or retarding the action of the motor with respect to the shaft.

In order to synchronize both motors when they are at rest but not in the same phase position, for instance when they are being assembled prior to operation, the non-rotatable engagement of the crank arm sleeve 21 of one motor, e.g. motor 11, with the shaft 13 is released by loosening bolts 27, and the angular relationship between the crank arm 20 and the now stationary shaft 13 is then changed by advancing or retarding the motor 11 until it is in the same phase position as the other motor 12 so that the crank arm of each motor is then in the same angular relationship with the shaft 13. Bolts 27 are then tightened to re-establish the non-rotatable engagement of crank arm sleeve 20 of motor 11 with the shaft 13. Thus, the motors, being fixed in the same phase position while at rest, must operate in synchronization.

In a preferred embodiment of the invention, the shaft 13 is formed of three portions, a central portion 13a, which is advantageously made so that its length is selectively adjustable, and end portions 13b (Fig. 1) and 13c. The end portions are then connected to the center portion in end to end relationship by cardan (universal) joints 14b and 14c, and the reciprocating motors are operatively connected to the end portions. With such a construction of the shaft, the motors need not be arranged precisely on a line. Furthermore, small inaccuracies which cannot always be avoided, of only for reasons of manufacturing technique, in the case of a conveyor trough consisting of a welded construction, do not exert a disturbing effect. On the other hand, the stresses which occur upon the welding frequently affect such a construction, even after a long period of time, if they are exposed to considerable loads upon transportation and use underground. In view of the multipartite articulated development of the connecting shaft, however, no difficulties arise therefrom since this shaft does not transmit any moments of flexure but only moments of rotation. While it is preferable to use two universal joints as described above, if desired but one such joint can be employed.

I claim:

1. A reciprocating drive for a vibrating device, said device comprising two reciprocating motors and a shaft, the motors being disposed at spaced intervals along the shaft, said motors each including a piston-cylinder arrangement having a piston arranged for reciprocation transversely of the shaft during operation of the motor, motion transferring means operatively connecting the piston of each piston-cylinder arrangement and the shaft, each motion transferring means being arranged for response to the reciprocating motion of its piston and for imparting a rocking motion to the shaft, and means for advancing or retarding the action of one motor with respect to the action of the other motor in imparting rocking motion to the shaft, whereby the action of said motors can be synchronized.

2. A device according to claim 1, the motion transferring means connecting at least one of the motors and the shaft comprising a sleeve coaxially mounted on the shaft for connection thereto, said sleeve having an enlarged bore adjacent one end thereof whereby there is provided at said end an annular space between the sleeve and the shaft, conical clamping elements disposed in said annular space so that upon axial compression thereof said elements are forced into tight engagement with the shaft and sleeve rendering the sleeve non-rotatable on the shaft, and the means for selectively applying the compression to said clamping elements, whereby the position of the sleeve can be adjusted relative to the position of the shaft.

3. A device according to claim 1 each motion transferring means comprising a sliding member and guide means defining a slide path for the sliding member and a crank arm having one end thereof operatively connected in non-rotatable manner to the shaft and the other end thereof operatively connected for articulation to the sliding member, each of the guide means being secured to the piston of its piston-cylinder arrangement so that it moves therewith and is disposed with the slide path thereof arranged transversely of the piston reciprocating axis, each slide member being freely slidably mounted in its guide means, whereby upon reciprocation of the pistons, the sliding members reciprocate in their guide means and the crank arm reciprocates imparting a reciprocating rotary motion to the shaft.

4. A device according to claim 3, each slide member being cylindrical about its sliding axis.

5. A device according to claim 1, said shaft including a central portion and two end portions, at least one of the end portions having one of the motors connected thereto and being connected to the center portion in end to end relationship by a universal joint.

6. A reciprocating drive for a vibrating device, said drive comprising of two reciprocating motors and a shaft, the motors being disposed at spaced intervals along the shaft, said motors each including a piston-cylinder arrangement having a double acting piston arranged for reciprocation transverse to the shaft during operation of the motor, motion transferring means connecting each piston-cylinder arrangement and the shaft, each motion transferring means being arranged for response to the reciprocating motion of its piston and for imparting a rocking motion to the shaft and comprising a cylindrical sliding member and guide means defining a sliding path for the sliding member and a crank arm having one end thereof operatively connected in non-rotatable manner to the shaft and the other end thereof operatively connected for articulation to the sliding member, each of the guide means being secured to an axially intermediate portion of the piston of its piston-cylinder arrangement so that it moves therewith and is disposed with the slide path thereof transversely of the reciprocation axis of its piston, each slide member being freely slidably mounted in its guide means, whereby upon reciprocation of the pistons the sliding members reciprocate in their guide means and the crank arms reciprocate imparting rotary motion to the shaft, the shaft including a central portion and two end portions, at least one of the end portions having one of the motors connected thereto and being connected to the central portion in end to end relationship by a universal joint, said motors being adapted to operate at the same r.p.m., and means for advancing or retarding the action of one motor with respect to the action of the other in imparting rocking motion to the shaft, whereby the action of said motors can be synchronized.

7. A device according to claim 6, the motion transferring means connecting at least one of the motors and the shaft comprising a sleeve coaxially mounted on the shaft for connection thereto, said sleeve having an enlarged bore adjacent one end thereof whereby there is provided at said end an annular space between the sleeve and the shaft, conical clamping elements disposed in said annular space so that upon axial compression thereof said elements are forced into tight engagement with the shaft and sleeve rendering the sleeve non-rotatable on the shaft, and the means for selectively applying the compression to said clamping elements, whereby the position of the sleeve can be adjusted relative to the position of the shaft.

References Cited in the file of this patent

UNITED STATES PATENTS

| | | |
|---|---|---|
| 1,975,369 | Morrison | Oct. 2, 1934 |
| 2,697,911 | Joy | Dec. 28, 1954 |

FOREIGN PATENTS

| | | |
|---|---|---|
| 477,609 | Great Britain | June 2, 1936 |